United States Patent
Yoshida et al.

(10) Patent No.: US 6,835,322 B2
(45) Date of Patent: Dec. 28, 2004

(54) COMPOSITION FOR MEMBER PREVENTING ACCRETION OF SNOW OR ICE AND MEMBER PREVENTING ACCRETION OF SNOW OR ICE USING THE SAME

(75) Inventors: Mitsunori Yoshida, Hokkaido (JP); Katsuo Kobayashi, Ibaraki (JP); Takeshi Sawai, Fukuoka (JP)

(73) Assignee: Hokkaido, Sapporo (JP)

( * ) Notice: Subject to any disclaimer, the term of this patent is extended or adjusted under 35 U.S.C. 154(b) by 0 days.

(21) Appl. No.: 10/220,046

(22) PCT Filed: Mar. 2, 2001

(86) PCT No.: PCT/JP01/01615

§ 371 (c)(1),
(2), (4) Date: Mar. 31, 2003

(87) PCT Pub. No.: WO01/64810

PCT Pub. Date: Sep. 7, 2001

(65) Prior Publication Data

US 2003/0164469 A1 Sep. 4, 2003

(30) Foreign Application Priority Data

Mar. 2, 2000 (JP) .................................. 2000-057226
Dec. 8, 2000 (JP) .................................. 2000-374587

(51) Int. Cl.$^7$ ................................................ C09K 3/18
(52) U.S. Cl. ........................... 252/70; 106/13; 428/446; 428/447

(58) Field of Search ........................ 252/70; 106/13; 428/446, 447

(56) References Cited

U.S. PATENT DOCUMENTS

| | | | |
|---|---|---|---|
| 4,701,508 A | 10/1987 | Homma et al. | 526/249 |
| 4,751,114 A | 6/1988 | Homma et al. | 427/407.1 |
| 6,013,724 A * | 1/2000 | Mizutani et al. | 524/588 |
| 6,596,060 B1 * | 7/2003 | Michaud | 106/2 |

FOREIGN PATENT DOCUMENTS

| | | | |
|---|---|---|---|
| EP | 0816452 A2 * | 1/1998 | |
| JP | 4-85369 A | 3/1992 | |
| JP | 7-138047 A | 5/1995 | |
| JP | 10-316820 A | 12/1998 | |
| JP | 11-293114 A * | 10/1999 | |
| JP | 11-293188 A * | 10/1999 | |
| JP | 2000-40422 A * | 2/2000 | |
| JP | 2002-256218 A * | 9/2002 | |
| JP | 2003-155410 A * | 5/2003 | |

* cited by examiner

*Primary Examiner*—Anthony J. Green
(74) *Attorney, Agent, or Firm*—Nixon & Vanderhye P.C.

(57) ABSTRACT

A composition for a snow- or ice-accretion inhibiting member which has a static friction coefficient of less than 1.3 relative to snow having a temperature range of 0 to −10° C. The composition of the present invention can show not only a good snow- or ice-accretion inhabiting property upon snowfall but also an improved snow slipping-off property upon temperature rise.

19 Claims, 1 Drawing Sheet

CONFIGURATION OF ALUMIUM FRAME

COMPOSITION FOR MEMBER PREVENTING ACCRETION OF SNOW OR ICE AND MEMBER PREVENTING ACCRETION OF SNOW OR ICE USING THE SAME This application is the U.S. national phase of international application PCT/JP01/01615 filed 02 Mar. 2001, which designated the U.S.

TECHNICAL FIELD

The present invention relates to a novel composition used for inhibiting snow- or ice-accretion, that is to inhibit the gradual build-up of snow and/or ice.

BACKGROUND ART

Hitherto, in various application fields such as ships, marine constructions, airplanes, vehicles, houses or buildings and power transmission steel towers, a variety of ice-accretion inhibiting paints and snow-accretion inhibiting paints have been studied in order to prevent damage due to snow coverage and icing.

In these applications, the use of organopolysiloxanes has been frequently proposed. The organopolysiloxanes form a water-repellant surface because of their low surface energy due to hydrocarbon chains regularly oriented thereon, and are free from freezing of molecular movement even at a temperature of not more than −30° C. because of their low glass transition temperature, thereby preventing hydrogen bonds from being formed therein upon icing. For this reason, the organopolysiloxanes are considered to exhibit a good snow-accretion inhibiting effect. Also, in order to improve a persistency of the snow- or ice-accretion inhibiting effect by preventing the organopolysiloxanes from suffering from bleed-out as well as peel-off upon removal of ice, compositions using a copolymer obtained by copolymerizing a specific organosilicon compound having a hydrolyzable silyl group with another monomer, in combination with a hydroxy-containing resin have been proposed (Japanese Patent Application Laid-Open (KOKAI) No. 3-84069); and compositions using a specific alkoxydimethylsiloxane (Japanese Patent Application Laid-Open (KOKAI) No. 2-147688). In addition, as a water-repellant coating composition, there has also been proposed the composition comprising an acrylic polymer, a silicone and a fluorine-containing polymer (Japanese Patent Application Laid-Open (KOKAI) No. 10-310740).

However, these conventionally known compositions have failed to exhibit sufficient snow- or ice-accretion inhibiting effects. Thus, during snowfall, it is necessary to attain a good snow- or ice-accretion inhibiting effect. On the other hand, when the ambient temperature increases after snowfall, snow deposited on the surfaces of building structures such as roofs gradually change to sticky snow having a large water content. This sticky snow adheres to the surfaces of the building structures and becomes difficult to peel off or remove. That is, after snowfall, there is a problem that the snow slipping-off property (reduced snow adherency) to assist in snow removal is deteriorated. Therefore, it is also necessary to improve the snow slipping-off (removal) property under such conditions. In particular, building structures having a gradient of not more than 45° suffer from severe snow coverage and, therefore, are required to show improved snow slipping-off/removal properties.

DISCLOSURE OF THE INVENTION

Figure 1:
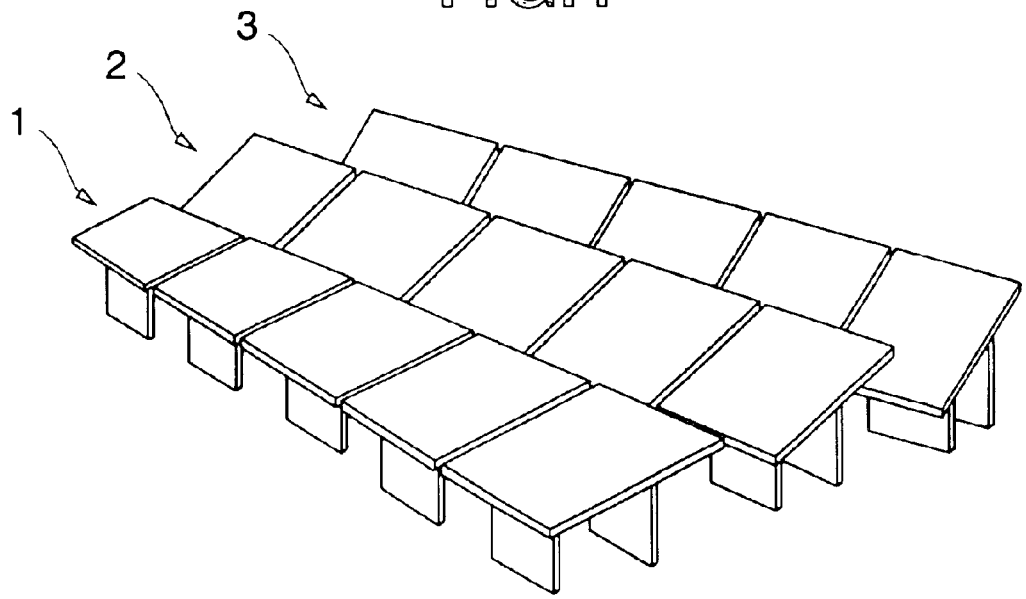
FIG. 1 is a perspective view of the test samples and their angles from a horizontal plane in the Examples and Comparative Examples.

It has been found that an excellent snow- or ice-accretion inhibiting effect upon snowfall does not necessarily lead to an excellent snow slipping-off or removal property. As a result of further studies, it has been found that although low adhesion (low icing force) between snow and the surface of the building structure is advantageous to attain a good snow- or ice-accretion inhibiting effect and the snow slipping-off property tends to be improved by a low viscosity of water present at an interface between snow and the building structure (lubrication action), conventionally known snow- or ice-accretion inhibiting agents fail to show a sufficient surface hydrophilic property and, therefore, have poor snow non-adherency or slipping-off properties.

That is, according to various aspects of the present invention, there are provided:

(1) A composition for snow- or ice-accretion inhibiting member, having a static friction coefficient of less than 1.3 as measured relative to snow having a temperature range of 0 to −10° C.;

(2) A composition for snow- or ice-accretion inhibiting member, having a static friction coefficient of less than 1.3 as measured relative to snow having a density range of 0.2 to 0.5 g/cm$^3$;

(3) A composition for snow- or ice-accretion inhibiting member, having a static friction coefficient of less than 1.3 as measured relative to snow having a water content range of 0 to 15%;

(4) A composition for snow- or ice-accretion inhibiting member, having a static friction coefficient of less than 1.3 as measured relative to snow having a temperature range of 0 to −10° C.;

(5) A composition for snow- or ice-accretion inhibiting member, having a static friction coefficient of less than 1.3 as measured relative to snow having a density range of 0.3 to 0.5 g/cm$^3$;

(6) A composition for snow- or ice-accretion inhibiting member, having a static friction coefficient of less than 1.3 as measured relative to snow having a water content range of 2 to 12%;

(7) A composition for snow- or ice-accretion inhibiting member, having a static friction coefficient of less than 1.2 as measured relative to snow having a temperature of −0.1° C.;

(8) A composition for snow- or ice-accretion inhibiting member, having a static friction coefficient of not more than 1.1 as measured relative to snow having a density of 0.3 g/cm$^3$;

(9) A composition for snow- or ice-accretion inhibiting member, having a friction coefficient of not more than 1.1 as measured relative to snow having a water content of 2.0%;

(10) A composition for snow- or ice-accretion inhibiting member, having a static friction coefficient relative to snow having a temperature of −10° C. which is larger than a static friction coefficient relative to snow having a temperature of 0° C. and which is not more than 7.5;

(11) A composition for snow- or ice-accretion inhibiting member, having a static friction coefficient relative to snow having a density of 0.2 g/cm$^3$ which is larger than a static friction coefficient relative to snow having a density of 0.45 g/cm$^3$ and which is not more than 7.5; and

(12) A composition for snow- or ice-accretion inhibiting member, having a static friction coefficient relative to snow having a water content of 0% which is larger than a static friction coefficient relative to snow having a water content of 15% and which is not more than 7.5.

Thus, the coating composition of the present invention provides an excellent snow-accretion inhibiting effect (reduced snow adherency) as well as ice-accretion inhibiting effect.

BEST MODE FOR CARRYING OUT THE INVENTION

The present invention will be described in more detail below.

The composition of the present invention has a static friction coefficient of less than 1.3, preferably not more than 1.2, more preferably not more than 1.15 as measured relative to snow having a temperature range of 0 to −10° C., snow having a density range of 0.2 to 0.5 g/cm$^3$ or snow having a water content range of 0 to 15%. Also, the composition of the present invention has a static friction coefficient of less than 1.3, preferably not more than 1.2, more preferably not more than 1.1, still more preferably not more than 1.0, most preferably not more than 0.9 as measured relative to snow having a temperature range of 0 to −10° C., snow having a density range of 0.3 to 0.5 g/cm$^3$ or snow having a water content range of 2 to 15%. Further, the composition of the present invention has a friction coefficient of not more than 1.1, preferably not more than 1.0, more preferably not more than 0.9 as measured relative to snow having a temperature of −0.1° C., snow having a density of 0.3 g/cm$^3$ or snow having a water content of 2.0%. In addition, the composition for a snow- or ice-accretion inhibiting member according to the present invention is characterized in that the static friction coefficient relative to snow having a temperature of −10° C. is larger than that relative to snow having a temperature of 0° C. and which is not more than 7.5, preferably not more than 5, more preferably not more than 3. Also, the composition for a snow- or ice-accretion inhibiting member according to the present invention is characterized in that the static friction coefficient relative to snow having a density of 0.2 g/cm$^3$ is larger than that relative to snow having a density of 0.45 g/cm$^3$ and which is not more than 7.5, preferably not more than 5, more preferably not more than 3. Further, the composition of the present invention is characterized in that the static friction coefficient relative to snow having a water content of 0% is larger than that relative to snow having a water content of 15% and which is not more than 7.5, preferably not more than 5, more preferably not more than 3.

In the above-described preferred embodiments of the present invention, the static friction coefficient relative to snow having a temperature range of 0 to −10° C. means the range covered by the specific static friction coefficients relative to snows having temperatures of 0° C., −0.1° C., −5° C. and −10° C., but does not mean the range covered by whole static friction coefficients measured relative to whole snows having a temperature range of from 0° C. to −10° C. Also, the static friction coefficient relative to snow having a density range of 0.2 to 0.5 g/cm$^3$ means the range covered by the specific static friction coefficients relative to snows having densities of 0.21 g/cm$^3$, 0.24 g/cm$^3$, 0.30 g/cm$^3$ and 0.45 g/cm$^3$, but does not mean the range covered by whole static friction coefficients measured relative to whole snows having a density range of from 0.2 to 0.5 g/cm$^3$. In addition, the static friction coefficient relative to snow having a water content range of 0 to 15% means the range covered by the specific static friction coefficients relative to snows having water contents of 0%, 0.1%, 2.0% and 15.0%, but does not mean the range covered by whole static friction coefficients measured relative to whole snows having a water content range of from 0 to 15%. Further, the static friction coefficient relative to snow having a temperature range of 0 to −1° C. means the range covered by the specific static friction coefficients relative to snows having temperatures of 0° C. and −0.1° C., but does not mean the range covered by whole static friction coefficients measured relative to whole snows having a temperature range of from 0 to −1° C. In addition, the static friction coefficient relative to snow having a density range of 0.3 to 0.5 g/cm$^3$ means the range covered by the specific static friction coefficients relative to snows having temperatures of 0.30 g/cm$^3$ and 0.45 g/cm$^3$, but does not mean the range covered by whole static friction coefficients measured relative to whole snows having a density range of from 0.3 to 0.5 g/cm$^3$. Furthermore, the static friction coefficient relative to snow having a water content range of 2 to 15% means the range covered by the specific static friction coefficients relative to snows having water contents of 2.0% and 15.0%, but does not mean the range covered by whole static friction coefficients measured relative to whole snows having a water content range of from 2 to 15%.

Next, individual compounds constituting the respective compositions of the present invention are specifically described below.

Explanation of Silicate Component

The composition of the present invention contains an organosilicate.

The organosilicate represents compounds obtained by substituting a part or whole of hydrogen atoms of silane (SiH$_4$) with an organic group via oxygen atom (hereinafter occasionally referred to as "organoxy group"). As long as such an organoxy group is present, other organic groups such as alkyl may be bonded to the silicon atom. Examples of the organosilicate may include organoxysilanes having 1 to 4 organic groups each bonded to a common silicon atom via oxygen atom, and organoxysiloxanes whose silicon constitutes a siloxane main chain ((Si—O)$_n$).

The organic groups each bonded to the silicon via oxygen atom are not particularly restricted. Examples of the organic groups may include linear, branched or cyclic alkyl groups. Specific examples of the organic groups may include methyl, ethyl, n-propyl, i-propyl, n-butyl, i-butyl, t-butyl, n-pentyl, i-pentyl, neopentyl, hexyl, octyl or the like. Also, as the organic groups, there may be used fluorinated alkyl groups obtained by substituting a part or whole of hydrogen atoms of these alkyl groups with fluorine atoms. Especially suitable organic groups are alkyl groups having 1 to 4 carbon atoms. As the other organic groups, there may be used aryl, xylyl, naphthyl or the like. Two or more different kinds of organic groups may be used in combination.

The above alkyl groups may be either linear or branched, and preferably have 1 to 4 carbon atoms. Specific examples of the alkyl groups may include methyl, ethyl, n-propyl, i-propyl, n-butyl, i-butyl, sec-butyl, t-butyl or the like. Further, as the alkyl groups, there may also be used fluorinated alkyl groups obtained by substituting a part or whole of hydrogen atoms of these alkyl groups with fluorine atoms. These alkyl groups may be used in combination of any two or more thereof.

Of these alkyl groups, methyl and/or ethyl are preferred from the standpoint of exhibiting a reduced adherence/good snow slipping-off property, and the most preferred alkyl group is methyl.

When the alkyl groups have too many carbon atoms, the organosilicate tends to be deteriorated in hydrolyzability, so that the formation of SiOH group becomes too slow when a coating film obtained from the composition is exposed to outside atmosphere, resulting in insufficient snow slipping-off property.

Examples of the organoxysilanes may include tetramethoxysilane, tetraethoxysilane, tetrapropoxysilane, tetrabutoxysilane, tetraphenoxysilane, dimethoxydiethoxysilane or the like.

Examples of the organoxysiloxanes may include condensates of the above organoxysilanes.

Specific examples of the preferred organosilicates used in the present invention may include tetraalkoxysilanes such as tetramethoxysilane, tetraethoxysilane, tetra-n-propoxysilane, tetraisopropoxysilane, tetra-n-butoxysilane, tetraisobutoxysilane, tetra-sec-butoxysilane and tetra-t-butoxysilane, and/or partially hydrolyzed condensates thereof. The hydrolysis rate of these organosilicates is 0 to 80%, preferably 20 to 70%, more preferably 30 to 60%.

Here, the hydrolysis rate is the value calculated according to the following formula (II), more specifically, the value obtained from the amount of water added upon the partial hydrolytic condensation of tetraalkoxysilanes or organoalkoxysilanes. Also, the hydrolysis rate is substantially identical to the value obtained by measuring a siloxane condensation degree of the obtained partially-hydrolyzed condensate (i.e., a factor "m" of oxygen of the partially-hydrolyzed condensate represented by the formula (I)).

$$X_nSi(OR)_{4-n} + mH_2O \rightarrow X_nSi(OR)_{4-n-2}O_m + 2mROH \quad (I)$$

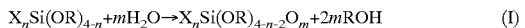

(wherein X and R are the same or different organic groups; and n is an integer of 0 to 3)

$$\text{Hydrolysis Rate} = 2m/(4-n) \times 100 = m/(2-n/2) \times 100 \quad (II)$$

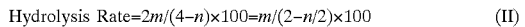

In addition, a coating film formed from the above organosilicate preferably has a water-contact angle (wetting angle) of not more than 60° C. Also, in the present invention, there may be used fluorinated organosilicates obtained by substituting a part or all of hydrogen atoms of alkyl groups of these organosilicates and/or partially hydrolyzed condensates thereof with fluorine atoms. These organosilicates may be used alone or in combination of any two or more thereof. Of these organosilicates, tetramethoxysilane and/or partially hydrolyzed condensates thereof are preferred because these compounds can readily form a silanol group owing to their high hydrolytic reactivity and, therefore, can readily provide a composition having a high snow slipping-off property.

As the organosilicates, there may be suitably used polymethoxypolysiloxanes as partially hydrolyzed condensates of tetramethoxysilane such as "MKC SILICATE MS51" and "MKC SILICATE MS56" both produced by Mitsubishi Chemical Corporation, or hydrolyzed solutions thereof since these compounds contain a less amount of impurities and can exhibit an excellent safety and a stable quality because the amount of high-toxic monomers contained therein is substantially ignorable.

As described above, the organosilicates used in the present invention include those obtained by substituting a part or whole of hydrogen atoms of $SiH_4$ with organic groups via oxygen or with other organic groups. Examples of these organosilicates may include various silane coupling agents or the like. Specific examples of the organosilicates may include trialkoxysilane compounds such as methyl trimethoxysilane, methyl triethoxysilane, methyl tripropoxysilane, methyl triisopropoxysilane, ethyl trimethoxysilane, ethyl triethoxysilane, ethyl tripropoxysilane, ethyl triisopropoxysilane, propyl trimethoxysilane, propyl triethoxysilane, butyl trimethoxysilane, butyl triethoxysilane, pentyl trimethoxysilane, pentyl triethoxysilane, hexyl trimethoxysilane, hexyl triethoxysilane, phenyl trimethoxysilane, phenyl triethoxysilane, phenyl tripropoxysilane, phenyl triisopropoxysilane, benzyl trimethoxysilane, benzyl triethoxysilane, 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, 3-methacryloxypropyl trimethoxysilane, 3-methacryloxypropyl triethoxysilane, vinyl trimethoxysilane, vinyl triethoxysilane, 3-mercaptopropyl trimethoxysilane, 3-mercaptopropyl triethoxysilane, 3-aminopropyl triethoxysilane, N-(2-aminoethyl)-3-aminopropyl trimethoxysilane, 3-ureidopropyl triethoxysilane, 1H,1H,2H,2H-perfluorohexyl trimethoxysilane, 1H,1H,2H,2H-perfluorohexyl triethoxysilane, 1H,1H,2H,2H,3H,3H-perfluorohexyl trimethoxysilane, 1H,1H,2H,2H,3H,3H-perfluorohexyl triethoxysilane, 1H,1H,2H,2H-perfluorooctyl trimethoxysilane, 1H,1H,2H,2H-perfluorooctyl triethoxysilane, 1H,1H,2H,2H,3H,3H-perfluorooctyl trimethoxysilane, 1H,1H,2H,2H,3H,3H-perfluorooctyl triethoxysilane, 1H,1H,2H,2H-perfluorodecyl trimethoxysilane, 1H,1H,2H,2H-perfluorodecyl triethoxysilane, 1H,1H,2H,2H,3H,3H-perfluorodecyl trimethoxysilane and 1H,1H,2H,2H,3H,3H-perfluorodecyl triethoxysilane, and partially hydrolyzed condensates thereof; dialkoxysilane compounds such as dimethyl dimethoxysilane, dimethyl diethoxysilane, diethyl dimethoxysilane, diethyl diethoxysilane, diphenyl dimethoxysilane, diphenyl diethoxysilane, 3-glycidoxypropylmethyl dimethoxysilane, 3-methacryloxypropylmethyl dimethoxysilane, 3-mercaptopropylmethyl dimethoxysilane, 3-aminopropylmethyl dimethoxysilane, N-(2-aminoethyl)-3-aminopropylmethyl dimethoxysilane, 1H,1H,2H,2H-perfluorohexyl dimethoxymonomethylsilane, 1H,1H,2H,2H-perfluorohexyl diethoxymonoethylsilane, 1H,1H,2H,2H,3H,3H-perfluorohexyl dimethoxymonomethylsilane, 1H,1H,2H,2H,3H,3H-perfluorohexyl diethoxymonoethylsilane, 1H,1H,2H,2H-perfluorooctyl dimethoxymonomethylsilane, 1H,1H,2H,2H-perfluorooctyl diethoxymonoethylsilane, 1H,1H,2H,2H,3H,3H-perfluorooctyl dimethoxymonomethylsilane, 1H,1H,2H,2H,3H,3H-perfluorooctyl diethoxymonoethylsilane, 1H,1H,2H,2H-perfluorodecyl dimethoxymonomethylsilane, 1H,1H,2H,2H-perfluorodecyl diethoxymonoethylsilane, 1H,1H,2H,2H,3H,3H-perfluorodecyl dimethoxymonomethylsilane and 1H,1H,2H,2H,3H,3H-perfluorodecyl diethoxymonoethylsilane, and partially hydrolyzed condensates thereof; chlorosilane compounds such as methyltrichlorosilane, vinyltrichlorosilane, phenyltrichlorosilane, methyldichlorosilane, dimethyldichlorosilane, dimethylchlorosilane, methylvinyldichlorosilane, 3-chloropropylmethyldichlorosilane, diphenyldichlorosilane and methylphenyldichlorosilane, and partially hydrolyzed condensates thereof; 3-aminopropyl trimethoxysilane; N-3-trimethoxysilylpropyl-m-phenylene diamine; N,N-bis[3-(methyldimethoxysilyl)propyl] ethylene diamine; N,N- bis[3-(trimethoxysilyl)propyl] ethylene diamine; P-[N-(2-aminoethyl)aminomethyl] phenethyl trimethoxysilane; or the like.

The coating composition of the present invention may contain organosilicates other than those obtained by substituting all of the hydrogen atoms of $SiH_4$ with organoxy groups. In this case, the content of the organosilicates other than those obtained by substituting all of the hydrogen atoms of $SiH_4$ with organoxy groups is not more than 200 parts by weight, preferably not more than 150 parts by weight (calculated as $SiO_2$) based on 100 parts by weight of the organosilicates obtained by substituting whole hydrogen atoms of $SiH_4$ with organoxy groups. When the content of the organosilicates other than those obtained by substituting all of the hydrogen atoms of $SiH_4$ with organoxy groups is too high, the obtained composition tends to have a poor snow slipping-off property.

For example, in order to enhance coatability of the composition when forming a coating film, or prevent the occurrence of cracks in the coating film (i.e., enhance a flexibility of the coating film), there may be used organosilicates obtained by substituting only a part of the hydrogen atoms of $SiH_4$ with the above alkyl groups. The content of such organosilicates obtained by substituting only a part of the hydrogen atoms of $SiH_4$ with the above alkyl groups is 0.1 to 200 parts by weight, preferably 1 to 150 parts by weight (calculated as $SiO_2$) based on 100 parts by weight of the organosilicates obtained by substituting all of the hydrogen atoms of $SiH_4$ with organoxy groups.

In addition, the composition of the present invention may also contain silicon compounds having hydrolyzable functional groups other than the organoxy groups, e.g., various halogens or the like. However, such silicon compounds tend to produce substances such as hydrochloric acid which are difficult to handle upon hydrolysis thereof, thereby causing unfavorable environmental problems. Therefore, the silicon compounds are present in an amount of not more than 100 parts by weight, preferably not more than 5 parts by weight (calculated as $SiO_2$) based on 100 parts by weight of the organosilicates. As a matter of course, the composition of the present invention may not contain any of these silicon compounds.

When used for painting, the composition preferably shows a good film forming-property so as to allow the composition to be rapidly cured at ordinary temperature. For this purpose, the silicate component may be previously blended with an appropriate amount of water or a solvent such as alcohol so as to prepare a composition capable of forming a proper film at ordinary temperature. The addition of water or the solvent enables the silicate as well as the below-mentioned hydrophobic compound to be uniformly dispersed or dissolved therein.

The silicate component is hydrolyzed by adding water thereto to form a silanol group, to increase the hydrophilic property of the composition.

For example, when 1 to 100 parts by weight, preferably 10 to 50 parts by weight of water, and 100 to 5,000 parts by weight, preferably 500 to 2,000 parts by weight of the solvent such as alcohol are blended in 100 parts by weight of the silicate component, the obtained composition shows an excellent coatability. For example, water and the solvent are previously blended with the silicate component to prepare a hydrolyzed solution of the silicate component. Then, the resultant solution is mixed with the below-mentioned hydrophobic compound and, if required, with an appropriate amount of solvent, or may be mixed with the hydrophobic compound previously dispersed or dissolved in the solvent.

The composition of the present invention in the form of a coating solution may also include one or more of the components explained below.

Explanation of Hydrophobic Compound

The hydrophobic compound is a component capable of imparting a hydrophobic property to the composition as compared to the use of a silicate alone. Specifically, there may be suitably used at least one hydrophobic compound selected from the group consisting of nonionic surfactants, fluorine-based surfactants, fluororesin powder, silicon resin powder and silicone-based surfactants.

The hydrophobic compound preferably exhibits a critical surface tension of not more than 20 mPa·s.

Examples of the nonionic surfactants include polyoxyethylene alkyl ethers, polyoxyethylene alkyl phenyl ethers, polyoxyethylene sorbitan fatty acid esters, sorbitan fatty acid esters or the like. Examples of the fluorine-based surfactants include perfluoroalkyl-containing perfluoroalkyl oligomers such as oligomers of perfluoroalkyl carboxylic acid salts, perfluoroalkyl phosphoric acid esters and perfluoroalkyl ammonium salts; perfluoroethyleneoxide adducts; perfluorocarboxylic acid salts; or the like. For example, as the fluorine-based surfactants, there may be used "SC-101" and "SC- 105" both produced by Asahi Glass Co., Ltd.

Examples of the fluororesin powder include low-molecular weight ethylene tetrafluoride polymers, more specifically, perfluoro compounds having an average molecular weight of preferably 1,500 to 20,000, more preferably 500 to 15,000, and a particle diameter of preferably 0.1 to 20 μm, more preferably 0.1 to 1 μm.

The silicon resin powder has an average particle diameter of preferably 0.1 to 20 μm, more preferably 0.1 to 1 μm. Examples of the silicone-based surfactants include those containing methylpolysiloxane as a hydrophobic group and polyalkyleneoxide as a hydrophilic group. For example, there may be suitably used "SILWET L-7001" produced by Nippon Unicar Co., Ltd.

Of these hydrophobic compounds, the fluorine-based surfactants are preferred because the excellent effect can be attained by using the fluorine-based surfactants in combination with the organosilicates, though the reason therefor is not clearly known.

The composition of the solvent used for preparation of the silicate solution may be appropriately controlled according to the kind of hydrophobic compound used so as to uniformly disperse the hydrophobic compound and the silicate therein.

Blending Ratio of Silicate to Hydrophobic Compound

The hydrophobic compound may be suitably contained in an amount of 0.1 to 100 parts by weight, preferably 1 to 50 parts by weight based on 100 parts by weight of the silicate. When the content of the hydrophobic compound is less than 0.1 part by weight, the obtained composition tends to show a low snow-accretion inhibiting effect. When the content of the hydrophobic compound is more than 100 parts by weight, the coating film obtained from the composition tends to be deteriorated in strength and adhesion to a substrate.

The use of the silicate according to the present invention can enhance a snow slipping-off property of the obtained composition. In addition, when the silicate is used in combination with the hydrophobic material such as fluororesin, the obtained composition can be further enhanced in its snow-accretion inhibiting property.

The solution containing the silicate, water, the solvent and the hydrophobic compound has a silicate concentration of preferably not less than 0.05% by weight, more preferably not less than 0.1% by weight (calculated as $SiO_2$). When the silicate concentration is less than 0.05% by weight, the obtained composition tends to become poor in snow slipping-off property. In addition, even when the silicate is used in combination with the fluororesin, the obtained composition fails to exhibit a sufficient snow-accretion inhibiting property.

The snow slipping-off property of the composition as well as the snow-accretion inhibiting property thereof when used in combination with the hydrophobic material such as fluororesins, are considerably influenced by the silicate concentration in solid components (non-volatile components) calculated as $SiO_2$. The silicate concentration in the solid components (non-volatile components) calculated as $SiO_2$ is preferably not less than 15% by weight, more preferably not less than 25% by weight. When the silicate concentration in solid components is less than 15% by weight, the obtained composition tends to become poor in snow slipping-off property, and even when the silicate is used in combination with the hydrophobic material such as fluororesins, the composition fails to exhibit a sufficient snow-accretion inhibiting property.

When it is required to obtain a coating film having an improved adhesion to a substrate and a good flexibility for preventing occurrence of cracks, appropriate resin components such as acrylic resins and other components may be added to the composition.

Examples of the acrylic resins may include ordinary acrylic resins such as methyl methacrylate polymers.

The above-described liquid composition may be applied onto various substrates. The substrates are not particularly restricted, and there may be used any materials capable of forming a coating film thereon, such as roofs or other structural materials. More specifically, the composition of the present invention can be suitably applied to constructions or structures mainly including roofs, electric cables, steel towers for electric cables, road signs or the like which require snow- or ice-accretion inhibiting properties as well as those having a surface inclined at an angle of not more than 45° from horizontal and, therefore, requiring a good snow slipping-off property.

EXAMPLES

The present invention is described in more detail by the following examples.

Measurement of Snow Temperature

The snow temperature was measured by K thermocouple-type digital thermometer "TNA-120" manufactured by Tasco Japan Co., Ltd.

Measurement of Snow Density

Snow blocks were sampled to measure weight and volume thereof. The snow volume was measured by a "Snow Sampler" (rectangular cup) capable of sampling 200 cc of snow, and the snow weight was measured by an electronic balance.

Measurement of Static Friction Force and Calculation of Static Friction Coefficient Coating solutions obtained in the below-mentioned Preparation Examples 1 to 5 were respectively applied onto an aluminum plate (tradename "A1050P" produced by Engineering Test Service Co., Ltd.; according to JIS H4000; surface roughness: 0.5 μm; length: 50 cm; width: 50 cm; thickness: 2 mm) using a roller ("Small Roller Model 6S-C113" manufactured by Otsuka Brush Co., Ltd.) to form a coating film having a dry thickness of about 2 μm. The coating films thus obtained using the respective coating solutions were used as samples of Examples 1 to 3 and Comparative Examples 1 and 2, respectively. Further, an uncoated glass plate (reinforced glass plate produced by Engineering Test Service Co., Ltd.; according to JIS R3206; surface roughness: 0.5 μm; length: 50 cm; width: 50 cm; thickness: 2 mm) was used as a sample of Comparative Example 3, and a Teflon plate (Teflon (polytetrafluoroethylene resin) produced by Engineering Test Service Co., Ltd.) was used as a sample of Comparative Example 4.

These samples were subjected to measurement of friction force relative to snow by the following method. The results are shown in Table 1.

(1) The test plates were set on a horizontal plane within a low-temperature room (laboratory capable of being controlled to a temperature of 0° C. or lower, and changing an inside temperature thereof at intervals of 0.1° C.).

(2) Snow having a snow temperature of −10° C. was deposited at a height of about 5 cm on the respective test plates under an ambient temperature condition of −10° C. Also, the test plates set on such a place where no snow was deposited, were used as blanks.

(The snow deposited on the test plates was an artificial snow prepared by scratching off "frost" formed by blowing steam onto a membrane. The snow has an average diameter (crystal size) of 0.025 mm, and a snow quality corresponding to a fresh snow having a density of about 0.2 g/ml. The test was conducted using a test device manufactured by Toyo Seisakusho Co., Ltd.)

(3) After completion of snowfall, the test plates were allowed to stand for one hour, and subjected to measurement of friction force.

Figure 2:
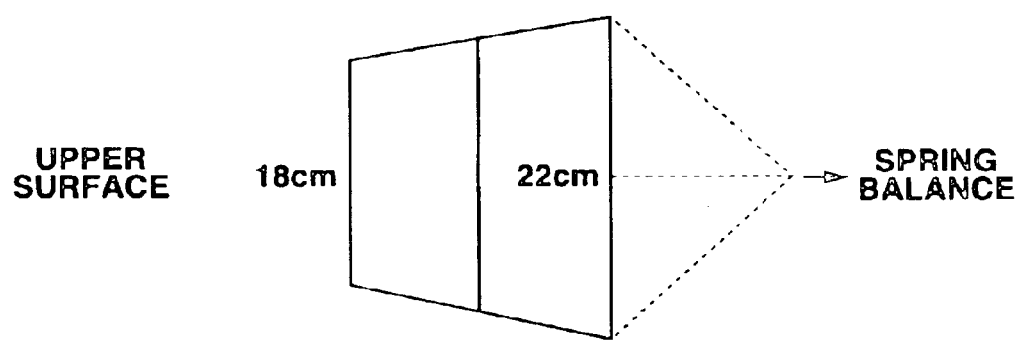
FIG. 2 is an illustration of the aluminum frame used in the Examples and Comparative Examples.
Figure 2:
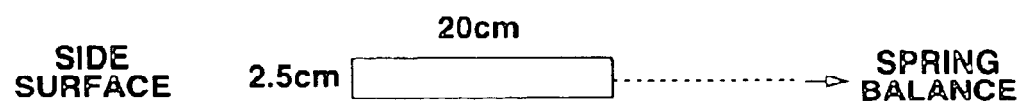

(4) An aluminum frame (configuration of the aluminum frame is shown in FIG. 2; tare weight: 120 g; frame inner volume: 1,000 cc) was pushed in the snow deposited on each test plate to be measured without causing the snow to move thereon until coming into contact with the test plate.

(5) The snow attached to an upper portion of the aluminum frame was removed, and a measuring device (spring balance: push-pull gauge) was fitted thereto.

(6) The aluminum frame was pulled at a constant speed of about 10 mm/min. A pulling force A at which the aluminum frame was first moved and a pulling force B for the test plates as blanks on which no snow was deposited, were respectively measured to calculate a friction force (A-B).

(7) The weight C of the snow received within the aluminum frame used for measuring the above friction force was measured by an electronic balance. In addition, the water content D in the snow was measured by an Innsbruck-type water content meter.

(8) After the ambient temperature was raised to −5° C., the test plates were maintained under this condition for one hour, and then the above procedures (4) to (7) were repeated.

(9) After the ambient temperature was further raised to −0.1° C., the test plates were maintained under this condition for one hour, and then the above procedures (4) to (7) were repeated.

(10) After the ambient temperature was further raised to 0° C., the test plates were maintained under this condition for one hour, and then the above procedures (4) to (7) were repeated.

Calculation of Static Friction Coefficient:

The static friction coefficient under each of the above conditions was calculated from the static friction force and the snow weight C according to the following formula:

(Static Friction Coefficient)=(Static Friction Force)/C

Composition

Meanwhile, "MKC SILICATE MS51" produced by Mitsubishi Chemical Corporation. (hydrolysis rate: 40%) was used as the organosilicate. Also, the composition of the "mixed solvent" used during the formulation was as follows.

TABLE 2

| | |
|---|---|
| Toluene | 23 parts by weight |
| Propylene glycol monomethyl ether acetate | 18 parts by weight |
| Butyl acetate | 12.5 parts by weight |
| Methyl isobutyl ketone | 9 parts by weight |
| Propylene glycol monomethyl ether | 22.5 parts by weight |
| n-butanol | 7.5 parts by weight |
| Isopropyl alcohol | 7.5 parts by weight |
| Total | 100.0 parts by weight |

Preparation Example 1

| | |
|---|---|
| Hydrolyzed solution of organosilicate (*1) | 118 parts by weight |

Note
*1: The composition of the hydrolyzed solution of organosilicate was as follows.

| | |
|---|---|
| Mixed solvent | 100 parts by weight |
| Organosilicate | 16 parts by weight |
| 10% hydrochloric acid solution | 2.0 parts by weight |

Preparation Example 2

Formulation:

| | |
|---|---|
| Hydrolyzed solution of organosilicate (*1) | 118 parts by weight |
| SC-101 (*2) | 4.8 parts by weight |

(corresponding to 10% by weight as a solid content based on the weight of the silicate contained in the hydrolyzed solution)
Note:
*2: Fluorine-based surfactant produced by Asahi Glass Co., Ltd.

Preparation Example 3

Formulation:

| | |
|---|---|
| Hydrolyzed solution of organosilicate (*1) | 118 parts by weight |
| SILWET L-7001 (*3) | 1.6 parts by weight |

(corresponding to 10% by weight as a solid content based on the weight of the silicate contained in the hydrolyzed solution)
Note:
*1: The composition of the hydrolyzed solution of organosilicate was the same as used in Preparation Example 1.
*3: Silicone-based surfactant produced by Nippon Unicar Co., Ltd.

Preparation Example 4

| | |
|---|---|
| Cold-curing type fluororesin paint (vinylidene fluoride-based paint) | 100 parts by weight |

Preparation Example 5

| | |
|---|---|
| Cold-curing type fluororesin paint (vinylidene fluoride-based paint) | 100 parts by weight |
| SILWET L-7001 | 2.5 parts by weight |

(corresponding to 10% by weight as a solid content based on the weight of solid components of the fluororesin paint)

Examples 1 to 3 and Comparative Examples 1 to 4

Aluminum plates were respectively coated with the coating solutions prepared in Preparation Examples 1 to 5 to produce samples of Examples 1 to 3 and samples of Comparative Examples 1 and 2. An uncoated glass plate was used as a sample of Comparative Example 3, and a Teflon plate (Teflon: registered trademark; tetrafluoroethylene polymer) was used as a sample of Comparative Example 4. Three samples were prepared for each coating solution. The three samples were set at angles of 10°, 30° and 45° from a horizontal plane, respectively. Three uncoated glass plates and three Teflon plates were respectively set at the same angles as above. The outline of the test is shown in FIG. 1 wherein (1) denotes samples held at an angle of 10°; (2) denotes samples held at an angle of 30°; and (3) denotes samples held at an angle of 45°.

These samples were subjected to snowfall test under the following conditions.

First Day

21:30 Initiation of snowfall (ambient temperature: −8° C. to −10° C.)

Second Day

8:00 Termination of snowfall 9:00 Initiation of temperature rise (until the ambient temperature was raised to 5° C.)

14:00 Termination of snowfall test

Results of Experiments:

During the snowfall test, among the test plates coated with the coating solution prepared in Preparation Example 2, the test plate set at an angle of 45° was free from snow accretion thereon, and the test plates set at angles of 30° and 10° were covered with snow. On the other hand, the test plates coated with the coating solutions prepared in Preparation Examples 1, 3, 4 and 5 as well as the Teflon plates, roof steel plates and glass plates were covered with snow at every setting angles.

When the ambient temperature was raised, snow was dropped off from the test plates in the following order for a period between 10:15 to 13:00.

10:15 Among the test plates coated with the coating solution prepared in Preparation Example 2, snow was dropped-off from the test plate set at an angle of 30°.

10:30 Snow was dropped-off from the test plates set at angles of 45° and 30° among those coated with the coating solution prepared in Preparation Example 1; the test plates set at angles of 45° and 30° among those coated with the coating solution prepared in Preparation Example 3; and the glass plate set at an angle of 45°.

11:00 Snow was dropped-off from the test plates set at angles of 45° and 30° among those coated with the coating solution prepared in Preparation Example 4; the test plates set at angles of 45° and 30° among those coated with the coating solution prepared in Preparation Example 5; and the glass plate set at an angle of 30°.

12:00 Snow was dropped-off from the Teflon plate set at an angle of 45°; the glass plate set at an angle of 10°; the test plate set at an angle of 10° among those coated with the coating solution prepared in Preparation Example 2; the test plate set at an angle of 100 among those coated with the coating solution prepared in Preparation Example 1; and the test plate set at an angle of 10° among those coated with the coating solution prepared in Preparation Example 3.

12:30 Snow was dropped-off from the Teflon plate set at an angle of 30°; and the roof steel plate set at an angle of 45°.

13:00 Snow was dropped-off from the roof steel plate set at an angle of 30°.

13:30 Termination of test

As a result, it was confirmed that snow deposited on the test plates set at an angle of 10' among those coated with the coating solutions prepared in Preparation Examples 4 and 5 as well as the Teflon plate and the roof steel plate set at an angle of 10°, was not dropped-off until the test was finally terminated, and these test plates were still covered with snow.

Considerations from the Test Results (1) Snow- and ice-accretion inhibiting effect:

The test plates used in Example 2 (which were coated with the solution prepared in Preparation Example 2 by using the organosilicate in combination with the hydrophobic compound), were free from snow coverage during the snowfall test. As a result, it was confirmed that the coating composition used in Example 2 showed an excellent snow-accretion inhibiting effect.

(2) Snow Slipping-off Effect

The test plates used in Example 2 as well as the test plates used in Example 1 (which were coated with the hydrolyzed solution of organosilicate prepared in Preparation Example 1), exhibited a higher snow slipping-off property (earlier snow-slippage) as compared to those used in Comparative Examples even though the setting angle of Examples was smaller than that of Comparative Examples. As a result, it was confirmed that the coating compositions used in these Examples were more effective than those used in Comparative Examples.

From the above descriptions, it is recognized that the composition can be improved in snow slipping-off property by adding the organosilicate thereto; and the composition using the organosilicate in combination with the hydrophobic compound can show an improved snow slipping-off property and simultaneously can be prevented from undergoing snow coverage upon snowfall and, therefore, is excellent in both of snow slipping-off property and snow- or ice-accretion inhibiting property.

TABLE 1

| | | | Examples | | | Comparative Example | | | |
|---|---|---|---|---|---|---|---|---|---|
| | | | 1 | 2 | 3 | 1 | 2 | 3 | 4 |
| Snow temp. -10° C. | A | g | 255 | 210 | 245 | 200 | 190 | 1870 | 175 |
| | B | g | 15 | 10 | 10 | 10 | 10 | 20 | 10 |
| | Static friction force | g | 240 | 200 | 230 | 190 | 180 | 1850 | 170 |
| | Snow weight C | g | 210 | 210 | 210 | 210 | 210 | 210 | 210 |
| | Density | g/ | 0.21 | 0.21 | 0.21 | 0.21 | 0.21 | 0.21 | 0.21 |
| | Water content D | % | 0 | 0 | 0 | 0 | 0 | 0 | 0 |
| | Static friction coefficient | | 1.14 | 0.95 | 1.10 | 0.90 | 0.86 | 8.81 | 0.81 |
| Snow temp. -5° C. | A | g | 280 | 240 | 265 | 255 | 245 | 1360 | 230 |
| | B | g | 15 | 10 | 15 | 15 | 10 | 20 | 10 |
| | Static friction force | g | 265 | 230 | 250 | 240 | 235 | 1340 | 220 |
| | Snow weight C | g | 240 | 240 | 240 | 240 | 240 | 240 | 240 |
| | Density | g/ | 0.24 | 0.24 | 0.24 | 0.24 | 0.24 | 0.24 | 0.24 |
| | Water content D | % | 0.1 | 0.1 | 0.1 | 0.1 | 0.1 | 0.1 | 0.1 |
| | Static friction coefficient | | 1.10 | 0.96 | 1.04 | 1.00 | 0.98 | 5.58 | 0.92 |
| Snow temp. -0.1° C. | A | g | 280 | 275 | 275 | 380 | 410 | 415 | 440 |
| | B | g | 10 | 10 | 10 | 15 | 15 | 15 | 15 |
| | Static friction force | g | 270 | 265 | 265 | 365 | 395 | 400 | 425 |
| | Snow weight C | g | 300 | 300 | 300 | 300 | 300 | 300 | 300 |
| | Density | g/ | 0.30 | 0.30 | 0.30 | 0.30 | 0.30 | 0.30 | 0.30 |
| | Water content D | % | 2.0 | 2.0 | 2.0 | 2.0 | 2.0 | 2.0 | 2.0 |
| | Static friction coefficient | | 0.90 | 0.88 | 0.88 | 1.22 | 1.32 | 1.34 | 1.42 |
| Snow temp. -0° C. | A | g | 370 | 360 | 365 | 605 | 650 | 400 | 680 |
| | B | g | 10 | 10 | 10 | 15 | 15 | 15 | 15 |
| | Static friction force | g | 360 | 350 | 355 | 590 | 635 | 385 | 665 |
| | Snow weight C | g | 450 | 450 | 450 | 450 | 450 | 450 | 450 |
| | Density | g/ | 0.45 | 0.45 | 0.45 | 0.45 | 0.45 | 0.45 | 0.45 |
| | Water content D | % | 15.0 | 15.0 | 15.0 | 15.5 | 15.5 | 15.5 | 15.0 |
| | Static friction coefficient | | 0.80 | 0.78 | 0.79 | 1.31 | 1.41 | 0.86 | 1.48 |

INDUSTRIAL APPLICABILITY

In accordance with the present invention, it is possible to obtain a coating composition capable of showing not only a good snow- or ice-accretion inhibiting property upon snowfall but also an improved snow slipping-off property upon temperature rise.

What is claimed is:

1. A snow- or ice-accretion inhibiting composition, having a static friction coefficient of less than 1.3 as measured relative to snow having a temperature range of 0 to -10° C. and containing a partially hydrolyzed condensate of an organosilicate and a hydrophobic compound.

2. A snow- or ice-accretion inhibiting composition, having a static friction coefficient of less than 1.3 as measured relative to snow having a density range of 0.2 to 0.5 g/cm$^3$ and containing a partially hydrolyzed condensate of an organosilicate and a hydrophobic compound.

3. A snow- or ice-accretion inhibiting composition, having a static friction coefficient of less than 1.3 as measured relative to snow having a water content range of 0 to 15% and containing a partially hydrolyzed condensate of an organosilicate and a hydrophobic compound.

4. A snow- or ice-accretion inhibiting composition, having a static friction coefficient of less than 1.3 as measured relative to snow having a temperature range of 0 to −1° C. and containing a partially hydrolyzed condensate of an organosilicate and a hydrophobic compound.

5. A snow- or ice-accretion inhibiting composition, having a static friction coefficient of less than 1.3 as measured relative to snow having a density of 0.3 to 0.5 g/cm$^3$ and containing a partially hydrolyzed condensate of an organosilicate and a hydrophobic compound.

6. A snow- or ice-accretion inhibiting composition, having a static friction coefficient of less than 1.3 as measured relative to snow having a water content range of 2 to 15% and containing a partially hydrolyzed condensate of an organosilicate and a hydrophobic compound.

7. A snow- or ice-accretion inhibiting composition, having a static friction coefficient of less than 1.2 as measured relative to snow having a temperature of −0.1° C. and containing a partially hydrolyzed condensate of an organosilicate and a hydrophobic compound.

8. A a snow- or ice-accretion inhibiting composition, having a static friction coefficient of not more than 1.1 as measured relative to snow having a density of 0.3 g/cm$^3$ and containing a partially hydrolyzed condensate of an oroanosilicate and a hydrophobic compound.

9. A snow- or ice-accretion inhibiting composition, having a friction coefficient of not more than 1.1 as measured relative to snow having a water content of 2.0% and containing a partially hydrolyzed condensate of an organosilicate and a hydrophobic compound.

10. A snow- or ice-accretion inhibiting composition, having a static friction coefficient relative to snow having a temperature of −10° C. which is larger than a static friction coefficient relative to snow having a temperature of 0° C. and which is not more than 7.5 and containing a partially hydrolyzed condensate of an organosilicate and a hydrophobic compound.

11. A snow- or ice-accretion inhibiting composition, having a static friction coefficient relative to snow having a density of 0.2 g/cm$^3$ which is larger than a static friction coefficient relative to snow having a density of 0.45 g/cm$^3$ and which is not more than 7.5 and containing a partially hydrolyzed condensate of an organosilicate and a hydrophobic compound.

12. A a snow- or ice-accretion inhibiting composition, having a static friction coefficient relative to snow having a water content of 0% which is larger than a static friction coefficient relative to snow having a water content of 15% and which is not more than 7.5 and containing a partially hydrolyzed condensate of an organosilicate and a hydrophobic compound.

13. A composition according to any one of claims 1–12, wherein said partially hydrolyzed condensate of the organosilicate has a hydrolysis rate of 0 to 80%.

14. A composition according to claim 13, wherein a coating film formed from said partially hydrolyzed condensate of the organosilicate has a water contact angle of not more than 60°.

15. A composition according to any one of claims 1–12, wherein said hydrophobic compound is a fluororesin powder.

16. A composition according to any one of claims 1–12, wherein said hydrophobic compound is a surfactant having a perfluoroalkyl group.

17. A composition according to any one of claims 1–12, wherein said hydrophobic compound has a critical surface tension of not more than 20 mpa·s.

18. A paint comprising the composition according to any one of claims 1–12.

19. A snow- or ice-accretion inhibiting member coated with the paint according to claim 18.

* * * * *